United States Patent [19]

Ritter

[11] 4,354,585

[45] Oct. 19, 1982

[54] OVERRUNNING CLUTCH SHIFTABLE TO FREE WHEELING

[75] Inventor: Joachim Ritter, Herzogenaurach, Fed. Rep. of Germany

[73] Assignee: Industriewerk Schaeffler OHG, Herzogenaurach, Fed. Rep. of Germany

[21] Appl. No.: 228,175

[22] Filed: Jan. 26, 1981

[51] Int. Cl.³ .................... F16D 15/00; F16D 41/06
[52] U.S. Cl. ........................................ 192/45; 192/47
[58] Field of Search ............................ 192/44, 45, 47; 188/82.3

[56] References Cited

U.S. PATENT DOCUMENTS

| | | | |
|---|---|---|---|
| 2,001,668 | 5/1935 | Maier | 192/45 X |
| 2,707,540 | 5/1955 | Morris | 192/44 X |
| 3,011,606 | 12/1961 | Ferris et al. | 192/45 |
| 3,174,598 | 3/1965 | Mattson | 192/45 |
| 3,757,904 | 9/1973 | Deyoung | 188/82.3 |
| 3,799,306 | 3/1974 | Rist | 192/45 |

FOREIGN PATENT DOCUMENTS 1011898 12/1965 United Kingdom ............... 188/82.3

Primary Examiner—Allan D. Hermann
Attorney, Agent, or Firm—Hammond & Littell, Weissenberger and Muserlian

[57] ABSTRACT

An overrunning clutch capable of being shifted to free wheeling in both directions and capable of being shifted to a camming position in one direction or free wheeling in opposite direction comprising an outer race provided with camming surfaces and an inner race, a plurality of cam rollers accommodated in a cage rolling on said races, a circular spring with one end secured to the outer race and the other end engaging the roller cage designed with a shift means at the latter end whereby the roller cage can be shifted from a camming position to a free wheeling position in both directions.

3 Claims, 3 Drawing Figures

OVERRUNNING CLUTCH SHIFTABLE TO FREE WHEELING

STATE OF THE ART

Overrunning clutches with a shift means to return the roller cage to its starting position are known. Swiss Pat. No. 318,951 describes such an arrangement wherein the shift means is a circular spring attached on the circumference of the outer race or sleeve which acts only to return the cage to a starting position. An axially displaceable ring is provided as the shift means whereby the rollers can be moved so that they either become cammed or run freely but this construction requires high manufacturing costs.

German Pat. No. 1,575,787 describes an overrunning roller clutch with a circular spring designed as a braking ring engaging the cage but a shift means for shifting to free wheeling is not provided therein. German DOS 1,575,797 describes an overrunning clutch capable of being shifted to free wheeling wherein a tension spring which can be turned about a dead center acts on the roller cage so that the cage can be adjusted whereby a shaft runs freely in one direction. An adjusting means whereby the free wheeling is in both directions of rotation is not provided therein.

OBJECTS OF THE INVENTION

It is an object of the invention to provide an overrunning roller clutch which can be shifted by movement of the cage so that it can run freely in both direction and capable of being shifted to a camming position in one direction or free wheeling in opposite direction, the cage adjustment being accomplished by a single means.

These and other objects and advantages of the invention will become obvious from the following detailed description.

THE INVENTION

The overrunning clutch of the invention capable of being shifted to free wheeling in both directions and capable of being shifted to a camming position in one direction or free wheeling in opposite direction is comprised of an outer race provided with camming surfaces and an inner race, a plurality of cam rollers accommodate in a cage rolling on said races, a circular spring with one end secured to the outer race and the other end engaging the roller cage designed with a shift means at the latter end whereby the roller cage can be shifted from a camming position to a free wheeling position in both directions.

In this embodiment, the cage is in its starting position as long as the shift means is not actuated so that the camming rollers mounted in the cage run freely in corresponding recesses in one direction of rotation and run toward the camming surfaces in the opposite direction of rotation. When the shift means is actuated, the cage moves so that the camming rollers can no longer run toward the camming surfaces regardless of the direction of rotation. After the shift means is released, the cage returns to its starting position due to the action of the circular spring. No elements are required for this purpose other than the circular spring which engages the outer race or sleeve at one end and the cage at the other end where it is provided with the shift means.

In one embodiment of the invention, the shift means of the circular ring protrudes through a slot in the outer race or sleeve and forms, together with the slot, stops for the starting position and for the shifted position whereby the correct alignment of the cage in both positions is ensured in a simple manner.

In a preferred embodiment of the invention, the shift means is formed by a U-shaped bend of the circular ring with one end of the U-shaped bend being provided with an extension which engages the cage which spring can be simply produced.

Referring now to the drawings.

Figure 1:
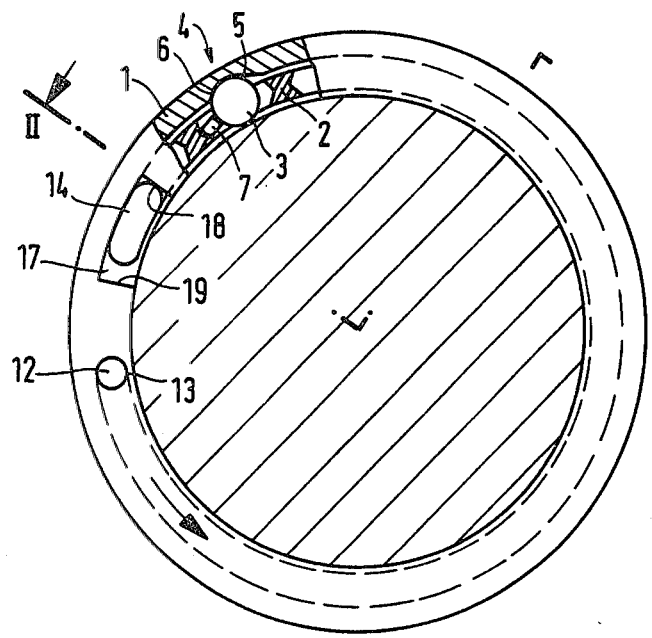
FIG. 1 is a partial cross-sectional view of one embodiment of the clutch of the invention and FIG. 2 is a cross-sectional view of the clutch of FIG. 1 taken along the line II—II.
Figure 3:
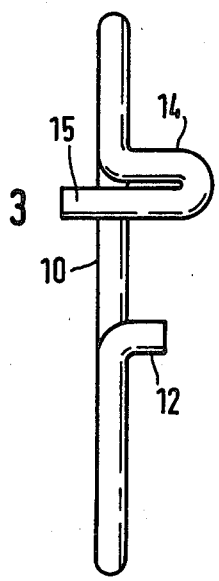
FIG. 3 is a side view of one circular spring useful in the clutch of the invention.
Figure 2:
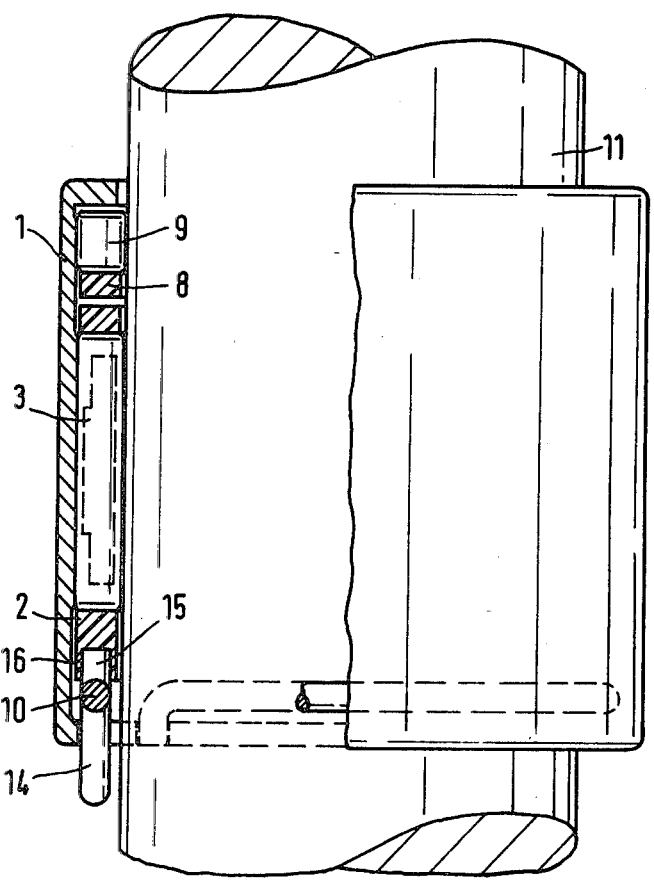

In the embodiment of FIGS. 1 and 2, a cage 2 is arranged in outer race or sleeve 1 and camming rollers 3 are mounted therein. A recess 4 is provided on the inner surface of outer race 1 for each camming roller 3 which recesses have a cam surface 5 at one end and a partially cylindrical bearing surface 6 at the other end. Each camming roller 3 is urged by a spring 7 inserted in cage 2 in the direction of cam surfaces 5. Another cage 8 is mounted in outer race 1 to accommodate bearing rollers 9.

A circular spring 10 is arranged inside outer race 1 on the side of cage 2 opposite to cage 8 and the diameter of the circular spring corresponds to the diameter of cage 2. The spring 10 does not bear on shaft 11 to which sleeve or outer race 1 is attached. At one end of circular spring 10 is a bend or projection 12 which protrudes into bore 13 of outer race 1 whereby that end of the circular spring is secured to outer race 1. The other end of circular spring 10 is provided with a U-shaped bend 14 whose free end is provided with an extension or projection 15 engaging a recess 16 of cage 2. The U-shaped bend 14 protrudes through a slot 17 of outer race 1 to the outside and acts as a shift means and end faces 18 and 19 of slot 17 form the stops for the shift means.

The method of operation of the overrunning clutch of the invention is as follows: In FIG. 1, the cage 2 is in the start position wherein the shift means 14 bears on end face 18 of slot 17 and the cage 2 is positioned so that the camming rollers 3 run towards cam surface 5 with a clockwise rotation of shaft 11 to couple outer race 1 with shaft 11. When shaft 11 is rotated counterclockwise, camming rollers 3 roll on bearing surfaces 6 so that shaft 11 will rotate freely relative to outer race 1.

When the shift means 14 is moved from the start position of FIG. 1 so that it bears on end face 19 of slot 17, the circular spring 10 is placed under tension and cage 2 is correspondingly moved by extension 15 so that the cage 2 is positioned such that the camming rollers 3 can no longer run towards cam surface 5. Shaft 11 is, therefore, free to rotate in either direction with respect to outer race 1 and as soon as shift means 14 is released, the circular spring 10 relaxes and cage 2 is returned to its original position by extension 15.

Various modifications of the clutch of the invention may be made without departing from the spirit or scope thereof and it is to be understood that the invention is intended to be limited only as defined in the appended claims.

What I claim is:

1. An overrunning clutch capable of being shifted to free wheeling in both directions and capable of being shifted to a camming position in one direction or free wheeling in opposite direction comprising an outer race provided with camming surfaces and an inner race, a plurality of cam rollers accommodated in a cage rolling on said races, a circular spring with one end secured to the outer race and the other end engaging the roller cage designed with a shift means at the latter end whereby the roller cage can be shifted from a camming position to a free wheeling position in both directions.

2. The clutch of claim 1 wherein the shift means protrudes through a slot of the outer race provided with stops for positioning the shift means in the start and shift positions.

3. The clutch of claims 1 or 2 wherein the shift means is a U-shaped bend in the circular spring and one leg of the U-shaped bend is provided with an extension engaging the cam roller cage.

* * * * *

UNITED STATES PATENT AND TRADEMARK OFFICE
CERTIFICATE OF CORRECTION

PATENT NO. : 4,354,585

DATED : October 19, 1982

INVENTOR(S) : JOACHIM RITTER

It is certified that error appears in the above-identified patent and that said Letters Patent is hereby corrected as shown below:

On the title page add:

[30] Foreign Application Priority Data

-- Jan. 24, 1980 Federal Republic of Germany

........................30 02 402 --.

Signed and Sealed this

Seventeenth Day of May 1983

[SEAL]

Attest:

DONALD J. QUIGG

Attesting Officer    Acting Commissioner of Patents and Trademarks